US011875111B2

(12) United States Patent
Casaregola et al.

(10) Patent No.: US 11,875,111 B2
(45) Date of Patent: Jan. 16, 2024

(54) BLOCK LEVEL DOCUMENT REVISION

(71) Applicant: ADP, Inc., Roseland, NJ (US)

(72) Inventors: Claire Casaregola, New York, NY (US); Harshita Daddala, New York, NY (US); Yair Pike, New York, NY (US); Lauren Miller, New York, NY (US); Michael Greene, New York, NY (US)

(73) Assignee: ADP, Inc., Roseland, NJ (US)

( * ) Notice: Subject to any disclaimer, the term of this patent is extended or adjusted under 35 U.S.C. 154(b) by 274 days.

(21) Appl. No.: 17/069,954

(22) Filed: Oct. 14, 2020

(65) Prior Publication Data

US 2022/0114335 A1    Apr. 14, 2022

(51) Int. Cl.
*G06F 17/00* (2019.01)
*G06F 40/197* (2020.01)
*G06F 40/166* (2020.01)
*G06F 40/106* (2020.01)

(52) U.S. Cl.
CPC .......... *G06F 40/197* (2020.01); *G06F 40/106* (2020.01); *G06F 40/166* (2020.01)

(58) Field of Classification Search
CPC ..... G06F 40/197; G06F 40/166; G06F 40/106
USPC ....................................................... 715/229
See application file for complete search history.

(56) References Cited

U.S. PATENT DOCUMENTS

| 11,106,757 | B1 * | 8/2021 | Curzi | G06F 40/169 |
| 2006/0041558 | A1 * | 2/2006 | McCauley | G06F 16/219 |
| 2016/0147905 | A1 * | 5/2016 | Grandhi | G06F 16/24554 |
| | | | | 707/722 |

\* cited by examiner

*Primary Examiner* — Jason T Edwards
(74) *Attorney, Agent, or Firm* — Foley & Lardner LLP

(57) ABSTRACT

A method, computer system, and computer program manage revisions in a document. The document is displayed in a graphical user interface. The document comprises a structured data object composed from a set of tiles, wherein each tile corresponds to one or more data nodes. The tiles are composable according to a domain-specific language of an integrated development environment. One or more revisions to the structured data object are received in sequence. The revisions to each data node of the set of tiles composing the structured data object are independently managed, enabling each revision to be independently reverted to a prior state irrespective of the sequence and revisions to other data nodes of the set of tiles and without reverting the other data nodes of the structured data object to their prior state.

21 Claims, 14 Drawing Sheets

FIG. 11

GRAPHICAL USER INTERFACE 600

DELETED NODE 1102

PROPERTIES 1104

Tile: AddressHistory — Draft last saved at 10:43 AM — Dependencies — Metadata — Test — Preview — Save Selected: labelNoAddresses BLOCKS
- Search blocks
- ▶ Layout
- Composite
- Data Repeater
- Row
- Section
- ✕ Table
- ✕ Tab Section
- Tile
- ▶ Controls
- Currency
- DateTime
- Dynamic
- Label
- ✕ Logical
- ✕ Lookup ▶ Section: SectionHeader (BR) (ABT)
  ▶ Label: LabelHeader - "Address History"
  Label: LabelUnderline

○ 3  ⊖ 2

Label: LabelUnderline

▶ Section: SectionBody
  ▶ * Section: SectionContentHidden (TD) (AD)
    DateTime: AsOfDateTime
  ▶ Section: SectionContent
    ▶ Row: rowNoRecords
      Column: newColumn
        *Text: textAddressName - "Enter Address Name"
    ▶ Row: rowBody (B)

Deleted Label
Search properties
▼ All
No Value
Display Style
Default
Input Width
No Value
Control Type
No Value
☐ Read Only
☑ Visible
Text Format
Wrap
☐ Required
Max Length
No Value
Default Value
No Value

BLOCK LEVEL DOCUMENT REVISION

BACKGROUND

1. Field

The present disclosure relates to methods and devices for creating special purpose computers whose hardware and programming enable transformation of a user interface and transformation of the function of a computer such that an untrained user may develop applications.

2. Description of the Related Art

Currently, when a new computer program is desired, a trained programmer uses one or more specialized computer languages to create code. The code instructs a computer to perform a desired function.

In most cases, even for simple programs, the programmer will have extensive training in order to write code that will be capable of creating the desired computer functionality. In the case of complex software, the programmer may need to develop an architecture for the computer program, and then write the code to implement the architecture. For a large project, an entire team of trained programmers may be needed to create the desired code.

Thus, the process of coding is complex, expensive, and, for some, individuals beyond their ability. For most individuals, the solution to providing a computer with a desired functionality is to purchase pre-programmed software to enable the desired functionality. For example, a user desiring to use a computer to perform business accounting may purchase an accounting program that provides a computer with the functionality of performing accounting procedures on the computer.

Nevertheless, a user may desire specialized functionality for the computer that is not currently for sale, or may desire to modify an existing program. However, unless that user is a trained programmer and is willing to expend the resources needed to code a new program, the user will not be able to use the desired specialized functionality on the computer.

SUMMARY

According to one embodiment of the present invention, a method is provided for managing revisions in a document. The method includes displaying the document in a graphical user interface. The document comprising a structured data object composed from a set of tiles, wherein each tile corresponds to one or more data nodes. The tiles are composable according to a domain-specific language of an integrated development environment. The method further includes receiving, in sequence, one or more revisions to the structured data object. The method further includes independently managing revisions to each data node of the set of tiles composing the structured data object. Each revision can be independently reverted to a prior state irrespective of the sequence and revisions to other data nodes of the set of tiles. The method further includes reverting a revision of the data node to a prior state irrespective of the sequence and without reverting the other data nodes of the structured data object to their prior state.

According to another embodiment of the present invention, a document management system is provided. The document management system includes a display system having a graphical user interface displayed thereon, and a computer system having a revision manager therein. The revision manager is configured to display the document in a graphical user interface, the document comprising a structured data object composed from a set of tiles. Each tile corresponds to one or more data nodes. The tiles are composable according to a domain-specific language of an integrated development environment. The revision manager is further configured to receive, in sequence, one or more revisions to the structured data object. The revision manager is further configured to independently manage revisions to each data node of the set of tiles composing the structured data object. Each revision can be independently reverted to a prior state irrespective of the sequence and revisions to other data nodes of the set of tiles. The revision manager is further configured to revert a revision of the data node to a prior state irrespective of the sequence and without reverting the other data nodes of the structured data object to their prior state.

According to yet another embodiment of the present invention, a computer program product for managing documents comprises a computer-readable-storage media with program code stored on the computer-readable storage media. The program code includes code for displaying the document in a graphical user interface. The document comprising a structured data object composed from a set of tiles, wherein each tile corresponds to one or more data nodes. The tiles are composable according to a domain-specific language of an integrated development environment. The program code further includes code for receiving, in sequence, one or more revisions to the structured data object. The program code further includes code for independently managing revisions to each data node of the set of tiles composing the structured data object. Each revision can be independently reverted to a prior state irrespective of the sequence and revisions to other data nodes of the set of tiles. The program code further includes code for reverting a revision of the data node to a prior state irrespective of the sequence and without reverting the other data nodes of the structured data object to their prior state.

BRIEF DESCRIPTION OF THE DRAWINGS

FIG. 11 a graphical user interface is illustrated showing a deleted node of a structured data object according to an illustrative example

DETAILED DESCRIPTION

The illustrative embodiments recognize and take into account one or more different considerations. For example, the illustrative embodiments recognize and take into account that an integrated development environment makes application programming easier for users with little to no background in computer software development. Instead of using traditional hand-coded computer programming, an integrated development environment enables developers to create applications using a visual user interface in combination with model-driven logic. Low-code development platforms reduce the amount of traditional hand coding, enabling accelerated delivery of business applications.

The illustrative embodiments recognize and take into account that developers in a low code development environment may want to work with documents in a draft state, so that document edits do not have to be frequently saved at the risk of losing work product. Additionally, developers desire the ability to revert experimental code changes to a previous saved state without the risk of losing the working state of the document.

Thus, the embodiments provide a method, system and computer program product for managing revisions in a document. In particular, a method may be present that helps an operator create a document in an integrated development environment template more quickly and easily as compared to document creation using currently available integrated development software.

In one illustrative example, a method is provided for managing revisions in a document. The method includes displaying the document in a graphical user interface. The document comprising a structured data object composed from a set of tiles, wherein each tile corresponds to one or more data nodes. The tiles are composable according to a domain-specific language of an integrated development environment. The method further includes receiving, in sequence, one or more revisions to the structured data object. The method further includes independently managing revisions to each data node of the set of tiles composing the structured data object. Each revision can be independently reverted to a prior state irrespective of the sequence and revisions to other data nodes of the set of tiles. The method further includes reverting a revision of the data node to a prior state irrespective of the sequence and without reverting the other data nodes of the structured data object to their prior state.

Figure 1:
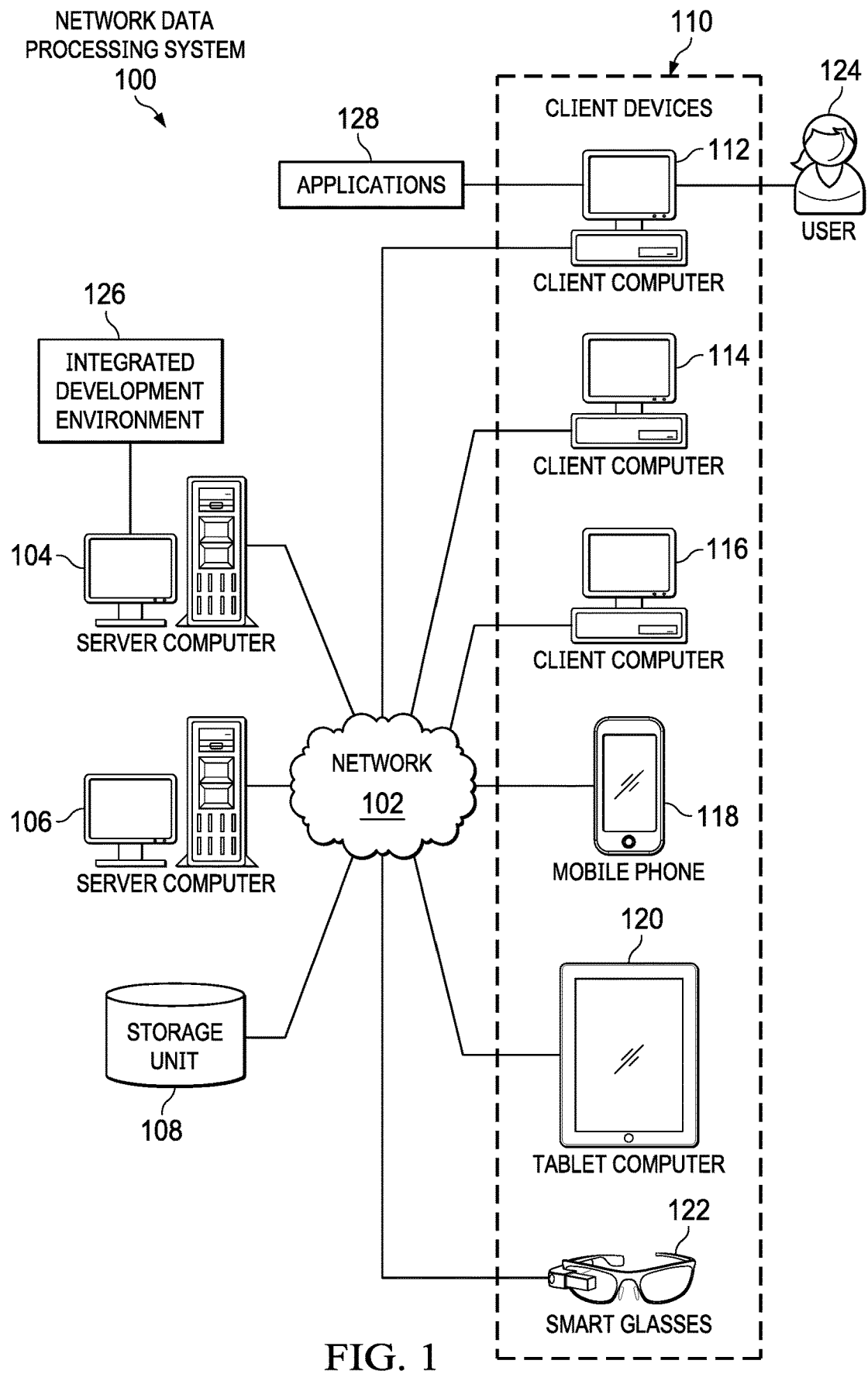
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 can use client computer 112 to interact with integrated development system 126. Integrated development system 126 is a system for creating applications 128 and templates 130 in an integrated development environment. Using Integrated development system 126, user 124 can manipulate graphical tiles, each representing well-defined blocks of code, in order to create applications 128.

In one illustrative example, user 124 can revise applications 128 by revising the properties and values of individual tiles. Since the development platform uses blocks of code, current embodiments provide a way to track and revert changes to the individual blocks composed on the graphical user interface.

Integrated development system 126 can automatically save draft of applications 128 at periodic intervals. However, unlike the first in last out reverting of other development systems, integrated development system 126 enables a user to individually reset a block and the block's properties to a last save state.

Integrated development system 126 independently manages each data node of the set of tiles composing the structured data object. Therefore, integrated development system 126 can be independently reverted. Each revision to a prior state irrespective of the sequence in which revisions are applied and revisions to other data nodes of the set of tiles. Integrated development system 126 allows platform developers to revert a revision of the data node to a prior state irrespective of the sequence and without reverting the other data nodes of the structured data object to their prior state.

The revision system of integrated development system 126 allows users to pick and choose specific properties to revert, as well as providing the option to revert an entire object-or block-or revert so properties of that block. This level of flexibility is not provided by other known development environments. Additionally, integrated development system 126 can provide an improved user interface designed to reflect the improved revision functionality.

For example, using a history section of a toolbar, a user can view a list of changed blocks in an active document. The list can be nested, so that the user can expand and collapse change details for a particular block. From this view, a user can revert the entire block, or specific property changes within the block.

Clicking on an item within the history will scroll the composition canvas to the selected block, and draw the user's attention to the block selection. For example, a pulse animation or highlight can be displayed for both the block and exchanged properties, drawing the user's attention to items that have been edited since the last save. A revert icon appears on each property that has been edited. Additionally, deleted blocks can reappear on the composition canvas in a read-only format, allowing the user to preview the deleted block before reverting to the saved state.

Integrated development system 126 provides a technical solution that overcomes a technical problem of quickly and easily generating new applications. Integrated development system 126 independently manages revisions to each data node of the set of tiles composing the structured data object. Each revision can be independently reverted to a prior state irrespective of the sequence and revisions to other data nodes. In this manner, integrated development system 126 enables user 124 to revert a revision of the data node to a prior state irrespective of the sequence and without reverting the other data nodes of the structured data object to their prior state. As a result, this technical solution to the technical problem of generating applications provides a technical effect in which new applications are generated more easily and quickly.

Figure 2:
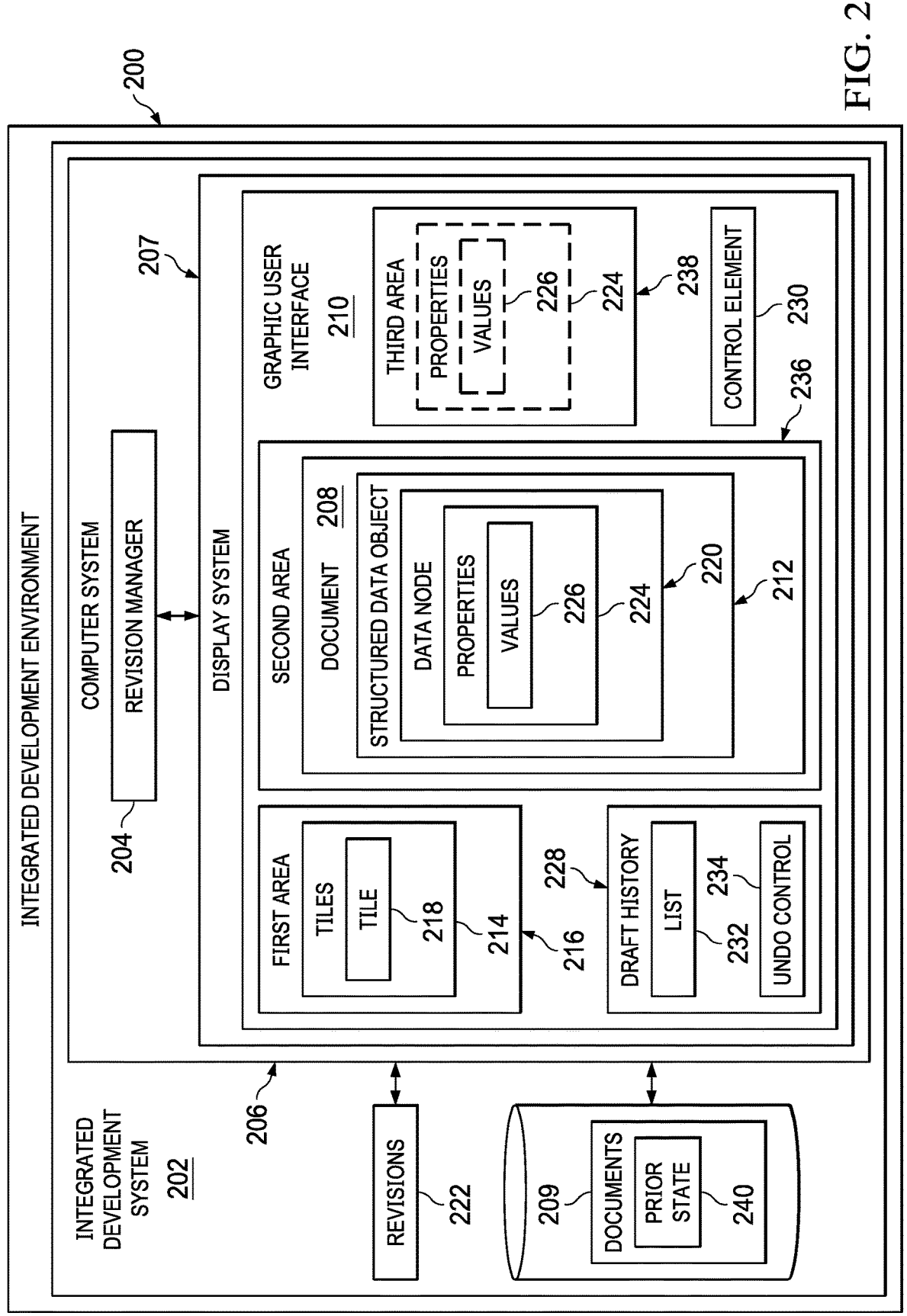
FIG. 2 is a block diagram of an integrated development environment in accordance with an illustrative embodiment.

With reference now to FIG. 2, a block diagram of an integrated development environment is depicted in accordance with an illustrative embodiment. In this illustrative example, integrated development environment 200 includes components that can be implemented in hardware such as the hardware shown in network data processing system 100 in FIG. 1.

In integrated development environment 200, a method for creating a template can be performed using integrated development system 202. In this illustrative example, the method for creating a template can be performed by revision manager 204 running on computer system 206. The method for creating a template can be performed in a manner that enables new templates and applications to be generated more easily and quickly while enabling a user to revert a revision of an individual data node to a prior state irrespective of the sequence and without reverting the other data nodes of the structured data object to their prior state.

In this illustrative example, integrated development system 202 includes a number of different components. As depicted, integrated development system 202 comprises computer system 206, revision manager 204 in computer system 206, and display system 207.

Revision manager 204 can be implemented in software, hardware, firmware or a combination thereof. When software is used, the operations performed by revision manager 204 can be implemented in program code configured to run on hardware, such as a processor unit. When firmware is used, the operations performed by revision manager 204 can be implemented in program code and data and stored in persistent memory to run on a processor unit. When hardware is employed, the hardware may include circuits that operate to perform the operations in revision manager 204.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

As depicted, revision manager 204 in computer system 206 displays a document 208 in a graphical user interface 210. Document 208 is an example of one of applications 128, shown in block form in FIG. 1, and can be saved in a database as 1 of documents 208. In integrated development system 202, the document 208 comprises at least one structured data object 212 that is composed from tiles 214. Graphical user interface 210 displays tiles 214 in a first area 216 of the graphical user interface 210. Each tile, such as tile 218, corresponds to a set of data nodes. As depicted, tile 218 corresponds to data node 220 of structured data object 212. Tiles 214 are composable into structured data objects, such as structured data object 212, according to a domain-specific language of the integrated development system 202.

In one illustrative example, revision manager 204 identifies, in sequence, one or more revisions 222 to the structured data object 212. Revisions 222 change a state of a data node of the structured data object, such as data node 220. In one illustrative example, revisions 222 to the structured data object 212 can be, but are not limited to, changing one or more properties 224 of data node 220, changing one or more values 226 of data node 220, appending an additional one or more of tiles 214 to the structured data object 212, and deleting a tile, such as tile 218, from structured data object 212.

In this illustrative example, revision manager 204 can identify revisions 222 in a number of different ways. For example, revision manager 204 can receive user input that revises one or more properties or values of data nodes of the structured data object, appends an additional one of tiles 214 to the structured data object, or deletes a tile from the structured data object. User input can be generated by a human machine interface that comprises an input system and a display system 207, enabling a user, such as user 124 of FIG. 1, to interact with integrated development system 202.

In one illustrative example of managing document 208, revision manager 204 displays the revisions 222 in a draft history 228 for the document 208. In one illustrative example, draft history 228 can be embodied as a drop-down list, modal, or other control element containing a list of data nodes that has been changed. Revision manager 204 displays the draft history 228 in response to receiving a selection of a control element 230 displayed in the graphical user interface.

In one illustrative example, the draft history 228 comprises: a list 232 of data nodes that has been changed; and a separate undo control 234 associated with each data node in the list 232. Each of the data nodes in the list 232 and the separate undo controls 234 are themselves graphic controls through which a user can interact with revision manager 204.

In one illustrative example, revision manager 204 receiving a selection of a data node from the list 232. In response to receiving the selection, revision manager 204 focuses a second area 236 of the graphical user interface 210 on the data node. In one illustrative example, the focusing can include highlighting the revision, including changes to properties 224 and values 226, in a third area 238 of the graphical user interface 210.

In one illustrative example, revision manager 204 can receive a selection of an undo control 234 associated with a data node in a list 232. In response to the selection, revision manager 204 reverts the associated data node to a prior state 240. Interacting with undo control 234 in draft history 228 of graphical user interface 210 enables a user to individual revert a revision of a data node to a prior state, irrespective of the sequence in which the revisions were received and without reverting other data nodes of the structured data object 212 to their prior state.

In one illustrative example, one or more technical solutions are present that overcome a technical problem with of quickly and easily generating new templates and applications. As a result, one or more technical solutions may provide a technical effect in which a new templates and applications are generated more easily and quickly while requiring less knowledge or training from an operator.

Computer system 206 can be configured to perform at least one of the steps, operations, or actions described in the different illustrative examples using software, hardware, firmware or a combination thereof. As a result, computer system 206 operates as a special purpose computer system in which revision manager 204 in computer system 206 enables a user to create new reports, applications, and templates more easily and quickly while requiring less knowledge or training. In particular, revision manager 204 transforms computer system 206 into a special purpose computer system as compared to currently available general computer systems that do not have revision manager 204.

In the illustrative example, the use of revision manager 204 in computer system 206 integrates processes into a practical application for creating a template in an integrated development environment that increases the performance of computer system 206 In other words, revision manager 204 in computer system 206 is directed to a practical application of processes integrated into revision manager 204 in computer system in 206 that manages revisions in a document within an integrated development environment. In this illustrative example, revision manager 204 in computer system 206 displays the document in a graphical user interface, the document comprising a structured data object composed from a set of tiles, wherein each tile corresponds to one or more data nodes, wherein the tiles are composable according to a domain-specific language of an integrated development environment; identifies, in sequence, one or more revisions to the structured data object; independently manages revisions to each data node of the set of tiles composing the structured data object wherein each revision can be independently reverted to a prior state irrespective of the sequence and revisions to other data nodes of the set of tiles; and reverts a revision of the data node to a prior state irrespective of the sequence and without reverting the other data nodes of the structured data object to their prior state. In this manner, revision manager 204 in computer system 206 results in an improved integrated development system that provides a practical application of managing revisions in a document such that the functioning of computer system 206 is improved.

The illustration of revision manager 204 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
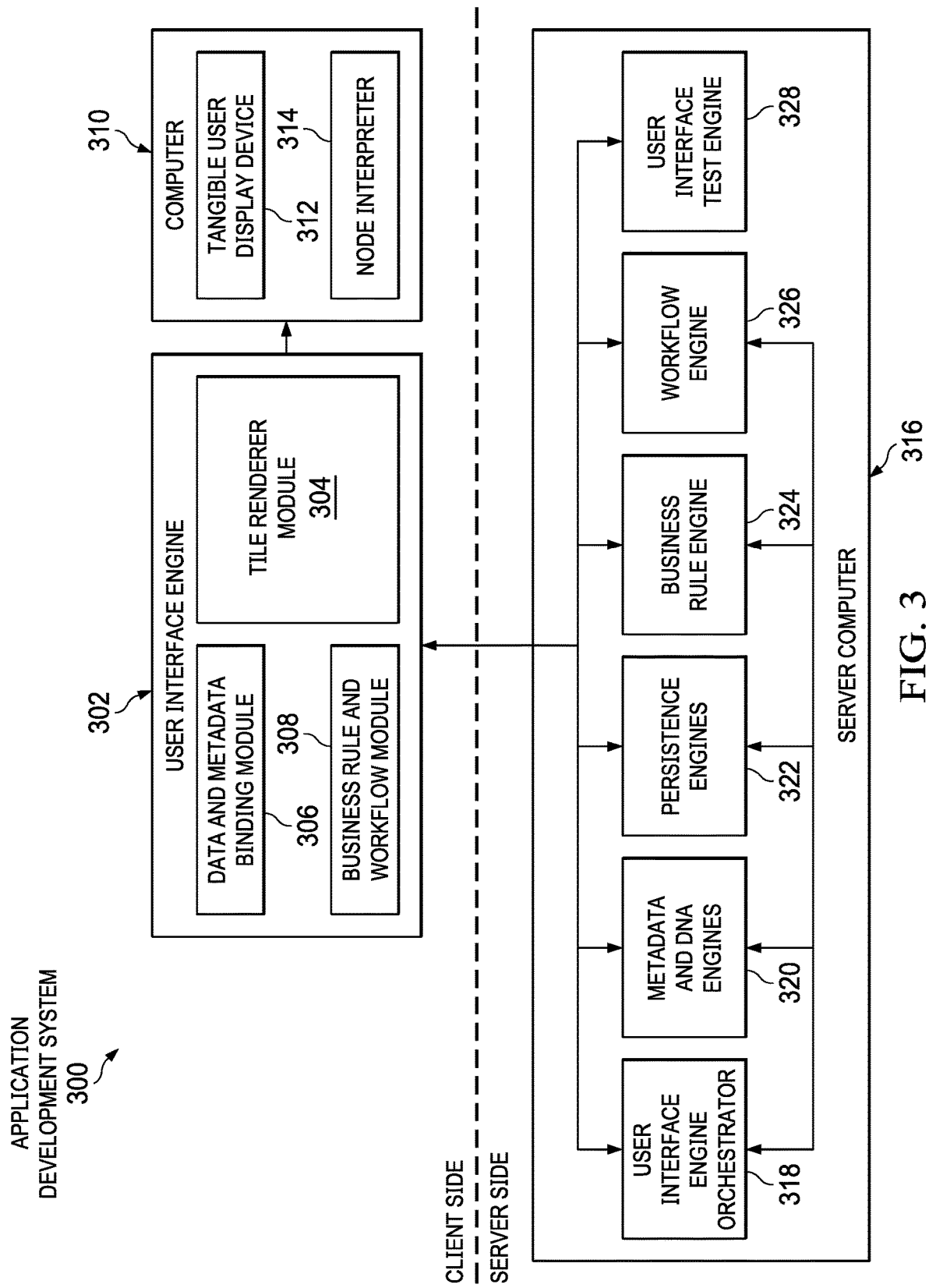
FIG. 3 is a block diagram illustrating an integrated development system depicted in accordance with an illustrative embodiment.

FIG. 3 is a block diagram illustrating an application development system depicted in accordance with an illustrative embodiment. Application development system 300 may be used to manipulate composable data nodes to build at least one of business rules, mini-apps, and apps. application development system 300 is one example of integrated development system 202 of FIG. 2.

User interface engine 302 is computer code, underlying data and structured data objects which provide underlying functionality and implementation capability for application designers using application development system 300. Primarily, user interface engine 302 operates client-side, meaning that user interface engine 302 operates on a specific client user's computer, such as one or more of client computer 112, client computer 114, and client computer 116 of FIG. 1. In one illustrative example, user interface engine 302 could be a web browser or an extension to a web browser.

Underlying the user interface, user interface engine 302 may include one or more modules. As depicted, user interface engine 302 includes tile renderer module 304, data and metadata binding module 306, and business rule and workflow module 308. Each module may be considered a collection of software or computer code which implements the functionality of the module.

Tile renderer module 304 is computer code which computer 310 may use to render tiles on tangible user display device 312. Tile renderer module 304 may receive input from the user, from data and metadata binding module 306, and from business rule and workflow module 308 to change and manipulate both the functionality of computer 310, which is used to execute tile renderer module 304, as well as tangible user display device 312, which is used to display rendered tiles.

Data and metadata binding module 306 is computer code which computer 310 may use to bind data and structured data objects to the user interface, possibly a browser, so that user interface engine 302 may keep track of all of the data and structured data objects used in executing business rules and workflows, as well as rendering tiles. Additional details regarding the functionality of data and metadata binding module 306 is described below with respect to how data and structured data objects are used in user interface engine 302.

Business rule and workflow module 308 is computer code which computer 310 may use to create, join, merge, or otherwise manipulate composable data nodes in order to create mini-apps, collections, and bundles. Business rule and workflow module 308 is the underlying code which allows a user to create mini-apps, collections, and bundles without the user having to code any of the software being developed. Using data and structured data objects tracked by data and metadata binding module 306, the user can manipulate tiles rendered by tile renderer module 304. Business rule and workflow module 308 uses these composable data nodes, together with work flows and business rules to create the mini-apps, collections, or bundles in a user-perceived codeless development environment.

Node interpreter 314 is hardware or software which is used to interpret or execute business rules in a business system. Node interpreter 314 can be software residing in a web browser on computer 310. However, the illustrative embodiments are not necessarily limited to only client computers or web browsers.

Node interpreter 314 is a code interpreter designed for a domain-specific language entirely composed of structured data objects. In one illustrative example, node interpreter 314 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, node interpreter 314 executes the composition of structured data objects without compilation. Data node constructs are composed into well-defined structured data objects according to selected block types and properties, replacing the tokenization and parsing that would otherwise occur during compilation.

In some illustrative embodiments, user interface engine 302 may take advantage of some server-side services operating on one or more server computers, such as server computer 316. "Server-side" means that computer 310 communicates with server computer 316, possibly over a network such as the Internet. Server-side resources are provided to support user interface engine 302. While not always necessary for implementation of user interface engine 302, server-side resources can enhance the functionality of user interface engine 302.

For example, the server-side resources may include user interface engine orchestrator 318. In some exemplary illustrative embodiments, user interface engine orchestrator 318 may be considered part of user interface engine 302 such that user interface engine 302 operates partially both on computer 310, but also on one or more server computers, such as server computer 316.

User interface engine orchestrator 318 may serve as a proxy to speed up processing of user interface engine 302. User interface engine orchestrator 318 may retrieve structured data objects and then identify whether data queries are for customer data, business rules, or any other structured data objects. User interface engine orchestrator 318 may then request such data, objects, or code, from the data center operating server-side. User interface engine orchestrator 318 may cache retrieved data, structured data objects, code, workflows, or objects to be sent back to user interface engine 302.

Server-side services may include other components other than user interface engine orchestrator 318. For example, server-side resources could include one or more metadata and DNA engines 320, which can be used to manage or provide structured data objects for use in user interface engine 302. Server-side resources may also include one or more persistence engines 322, which can be used to save work done using user interface engine 302. Server-side resources may also include business rule engine 324, which may be used to create or store business rules that are used by user interface engine 302 in the user-perceived codeless building of mini-apps, collections, and bundles.

Server-side resources may also include workflow engine 326, which may be used to create or store workflows that are used by user interface engine 302 in the user-perceived codeless building of mini-apps, collections, and bundles.

Server-side resources may also include user interface test engine 328, which may be used to test both the functionality of user interface engine 302, possibly as well as the mini-apps, collections, and bundles created using user interface engine 302.

Figure 4:
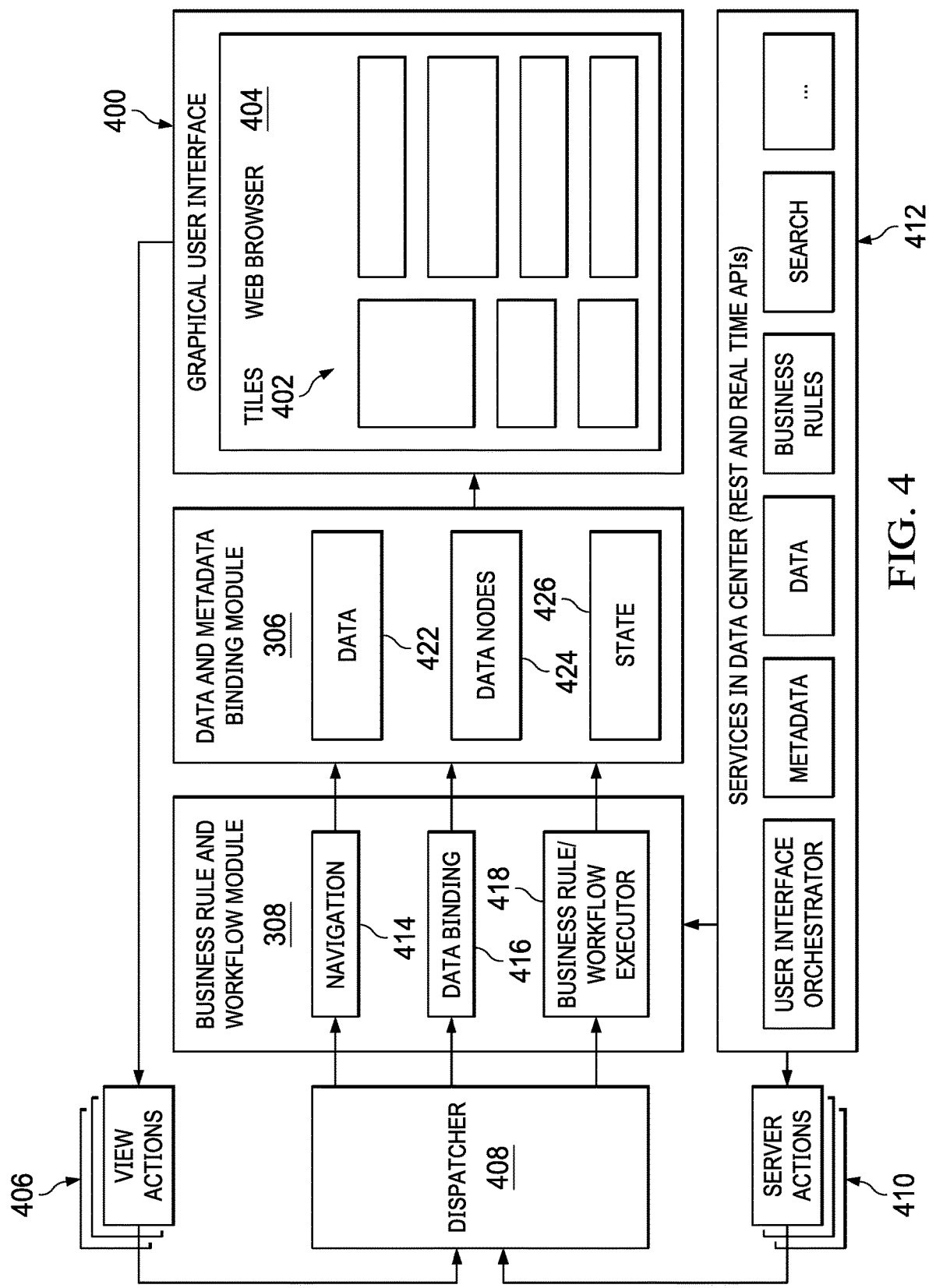
FIG. 4 is an illustration of a block diagram of an example of an operation of a user interface engine of an integrated development system data in accordance with an illustrative embodiment.

FIG. 4 is an illustration of a block diagram of an example of an operation of a user interface engine shown in FIG. 3, in accordance with an illustrative embodiment. The example shown in FIG. 4 does not necessarily limit operation of user interface engine 302 as shown in FIG. 3. Nevertheless, FIG. 4 may be read in conjunction with FIG. 3.

In an illustrative embodiment, tile renderer module 304 in FIG. 3 may be used to generate graphical user interface 400. Graphical user interface 400 may take the form of tiles 402 shown in web browser 404. Each of tiles 402 may represent a building block. Alternatively, a tile may represent a mini-app, a collection, or even a bundle. Users may interact with graphical user interface 400, triggering, for example, a "view actions" command 406.

These actions are sent to dispatcher 408, which may be part of user interface engine 302, shown in FIG. 3. Dispatcher 408 may send the actions to the business rule and workflow module via subscriptions registered with dispatcher 408. Dispatcher 408 may also send server actions 410 sent by data center 412 to business rule and workflow module 308 in FIG. 3 for use in combination with the actions started by the user.

Business rule and workflow module 308 may run queries and apply business rules and other logic. Business rule and workflow module 308 may provide navigation 414, data binding 416, and execution by business rules and workflows executor 418.

Data and metadata binding module 306 in FIG. 3 may apply changes to user interface state held in memory. User interface state may be held in a tree structure containing data 422, data nodes 424, and tile state 426. In turn, tile renderer module 304 in FIG. 3 may render graphical user interface 400. Tile renderer module 304 may listen to state changes in the tree structure and efficiently update only data 422 and data nodes 424 that need re-rendering.

Figure 5:
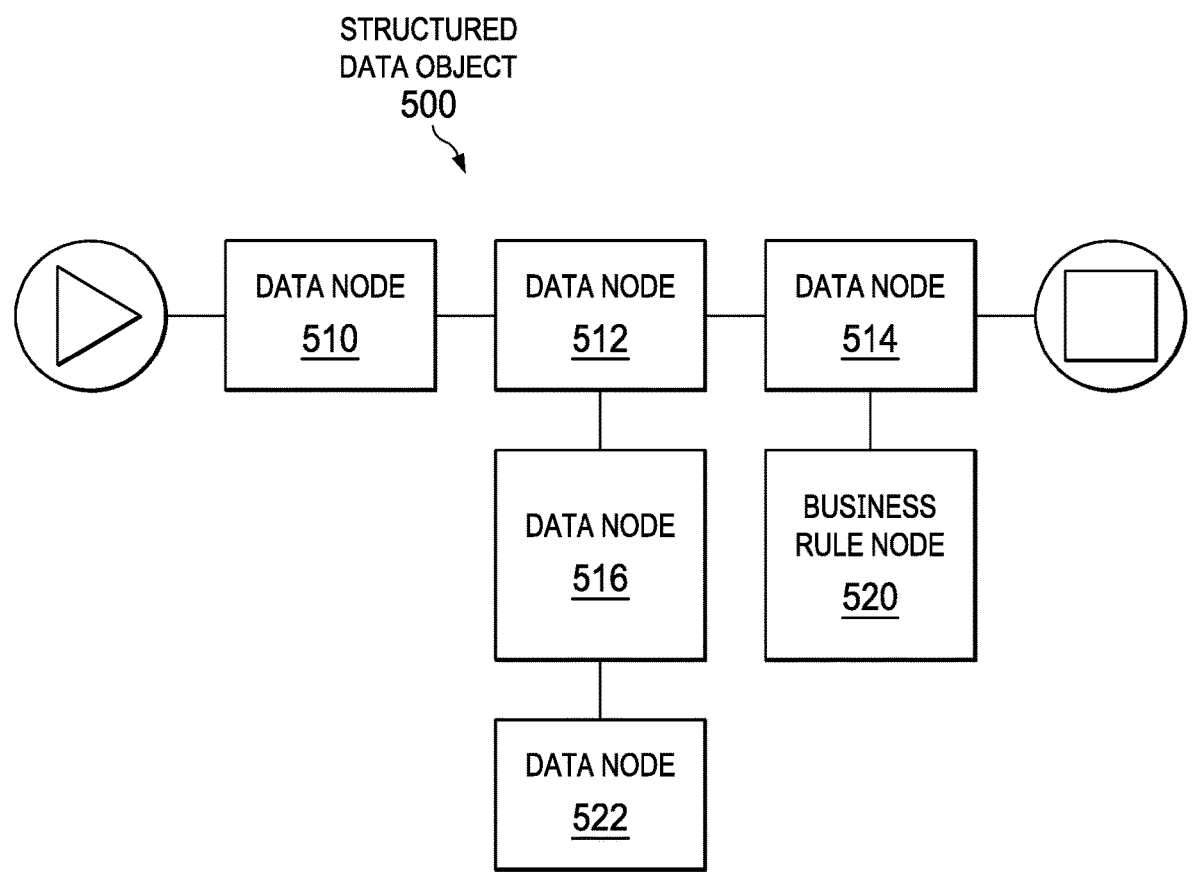
FIG. 5 is an illustration of a block diagram of a structured data object in accordance with an illustrative embodiment.

With reference next to FIG. 5, an illustration of a block diagram of a structured data object is depicted in accordance with an illustrative embodiment. Structured data object 500 is an example of a composition of well-defined data nodes that can be linked together according to a domain-specific language to create mini-apps, collections, or bundles in a user-perceived codeless development environment, such as application development system 300 of FIG. 3.

Structured data object 500 includes data nodes 510, 512, and 514. Data nodes 510, 512, and 514 are well-defined structured data objects that can be manipulated within data and metadata binding module 306 of FIG. 3 to create desired business rules. Tile renderer module 304 of user interface engine 302 may visually present data nodes 510, 512, and 514, enabling the user to build different business rules, mini-apps and apps in application development system 300 of FIG. 3. Each of data nodes 510, 512, and 514 correlates to one or more functions, which in turn can be interpreted by node interpreter 314 of FIG. 3 for implementing the corresponding business rule. The different permutations of the compositions of these functions, as well as differentiated input, enable the execution of the different business rule behaviors at runtime.

The functions of data nodes 510, 512, and 514 operate inside of a context defined at the beginning of the business rule execution step, which is the target object for all symbols defined in the course of the business rule execution, as well as for all input to and output from the business rule itself. In this manner, data nodes 510, 512, and 514 act as a configuration object to the code being executed, defining an execution context (or scope being executed against) to other joined data nodes.

For example, structured data object 500 further includes data node 516. Data node 516 provides additional context for execution of related data node 512. Specifically, data node 516 may indicate that data node 512, as well as child data nodes thereof, should be interpreted within the context of data node 516.

Structured data object 500 further includes data node 518. Data node 522 provides additional context for execution of both related data node 512 and data node 516. For example, data node 522 may indicate that information required for execution of data node 512 should be requested and received from one or more web services. Data node 522 requests and returns the same context updated with the information received through the web services.

Structured data object 500 further includes business rule node 520. Business rule node 520 provides additional context for execution of related data node 514. Specifically, business rule node 520 may indicate a consuming service for receipt of business rule output provided by related data node 514. Business rule node 520 requests and returns information to a consuming service, such as a web page.

Figure 6:
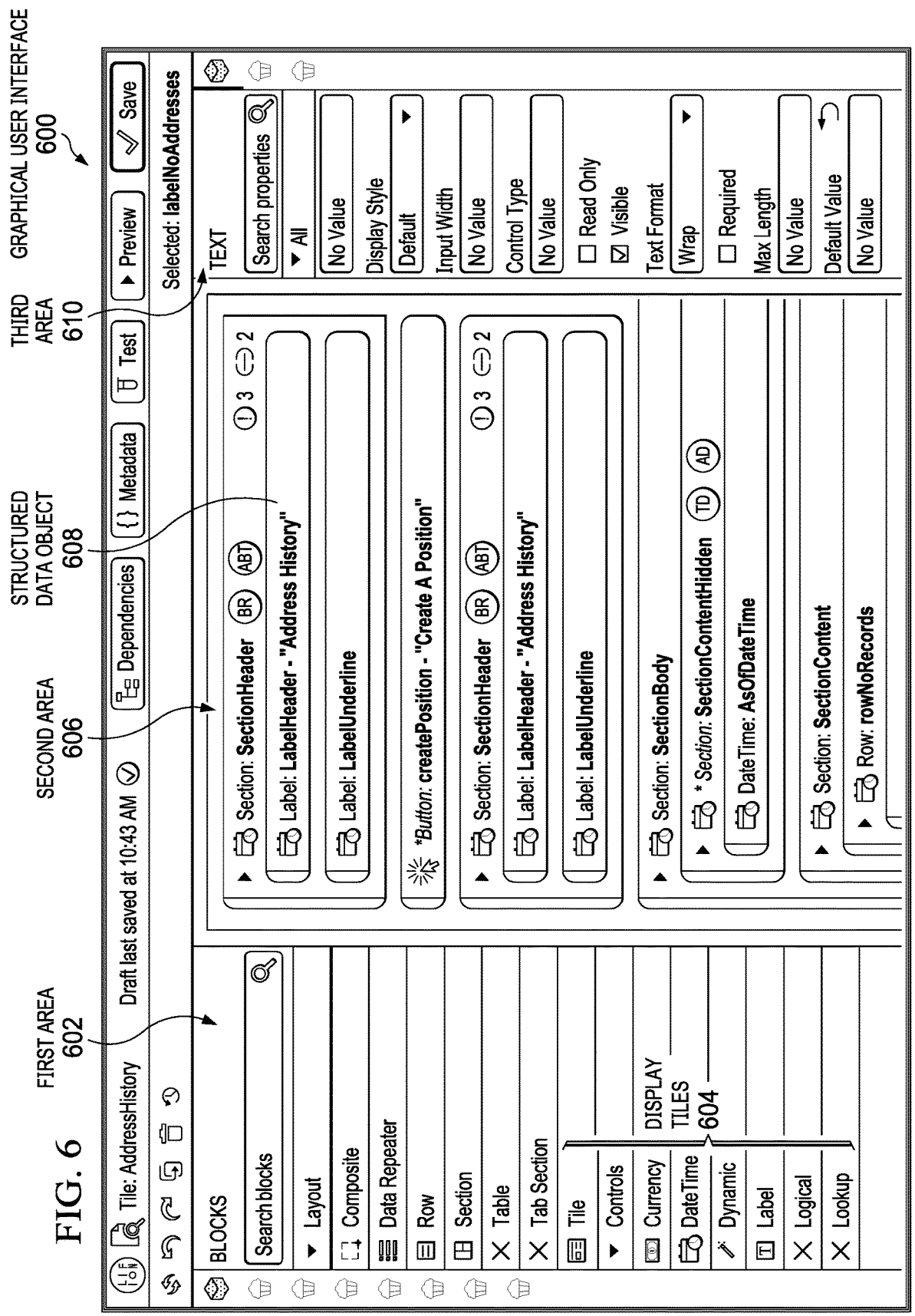
FIG. 6 is a graphical user interface for composing structured data objects according to a domain-specific language depicted according to an illustrative example.

With reference next to FIG. 6, a graphical user interface for composing structured data objects according to a domain-specific language is depicted according to an illustrative example. Graphical user interface 600 is an example of graphical user interface 210 of FIG. 2.

As depicted, graphical user interface 600 includes a first area 602. First area 602 displays tiles 604. Tiles 604 are examples set of tiles 214, shown in block form in FIG. 2.

As depicted, graphical user interface 600 includes a second area 606. Second area 606 is an example of second area 236 of FIG. 2. Second area 606 displays a plurality of data nodes that have been linked together to form a structured data object 608 according to a domain-specific language. Dragging tiles from a first area 602 to second area 606 appends the corresponding set of data nodes into a structured data object 608 according to the context defined by parent nodes.

As depicted, graphical user interface 600 includes third area 610. Third area 610 is an example of third area 238 of FIG. 2. Third area 610 displays properties and values for the various data nodes of structured data object 608.

Figure 7:
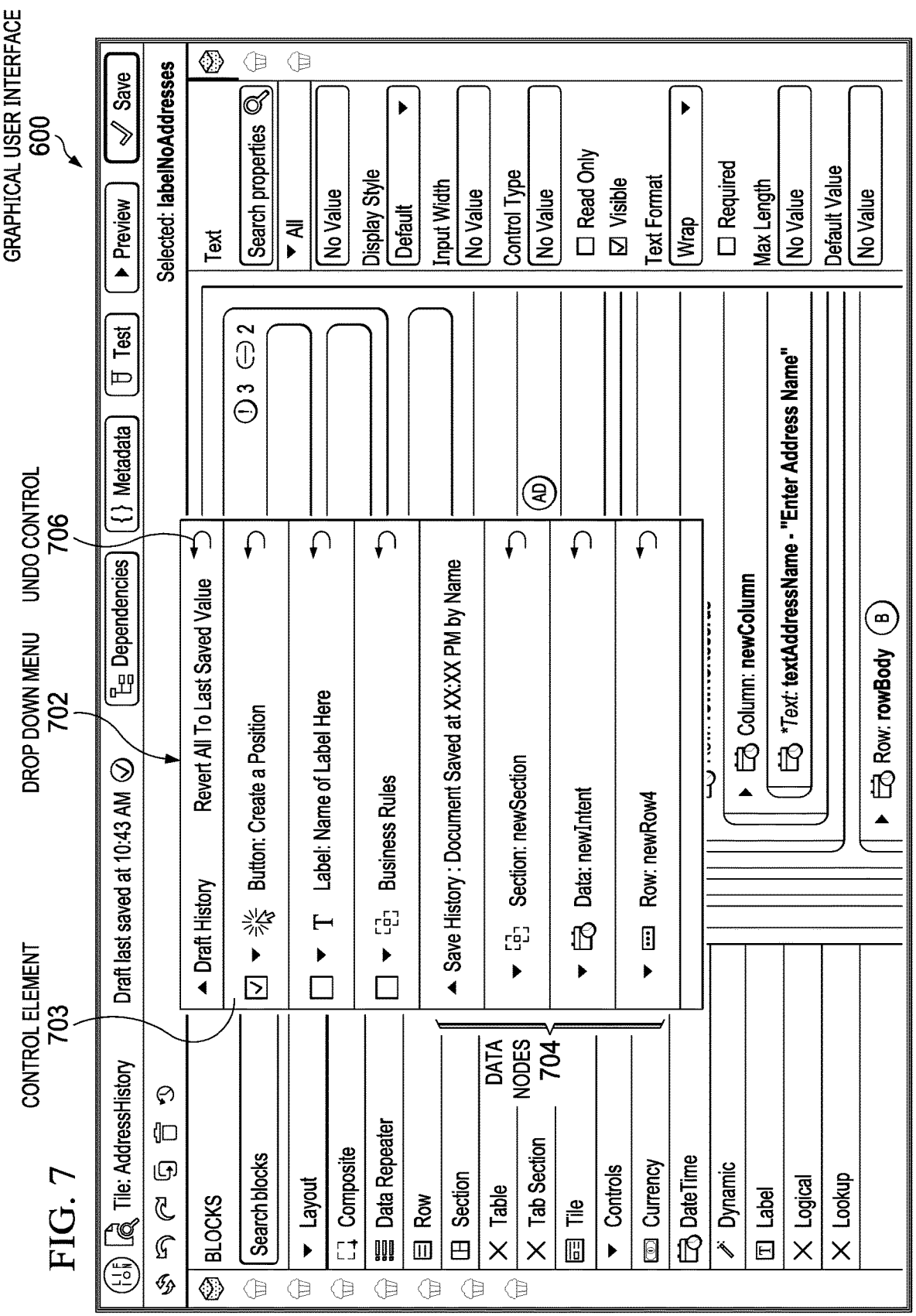
FIG. 7 is a graphical user interface having a drop-down menu illustrated according to an illustrative example.

With reference next to FIG. 7, a graphical user interface 600 is illustrated having a drop-down menu according to an illustrative example. In an illustrative example, graphical user interface 600 displays drop-down menu 702 in response to receiving user input that selects control element 703. Drop-down menu 702 is an example of draft history 228 of FIG. 2.

In an illustrative example, drop-down menu 702 displays a list of data nodes 704 effected by changes to structured data object 608. Additionally, drop-down menu 702 displays an undo control 706 for each of data nodes 704 that has been changed. Interacting with the undo control 706 elements of drop-down menu 702 allows the user to individually revert changes in the associated structured data object to a prior saved state.

Figure 8:
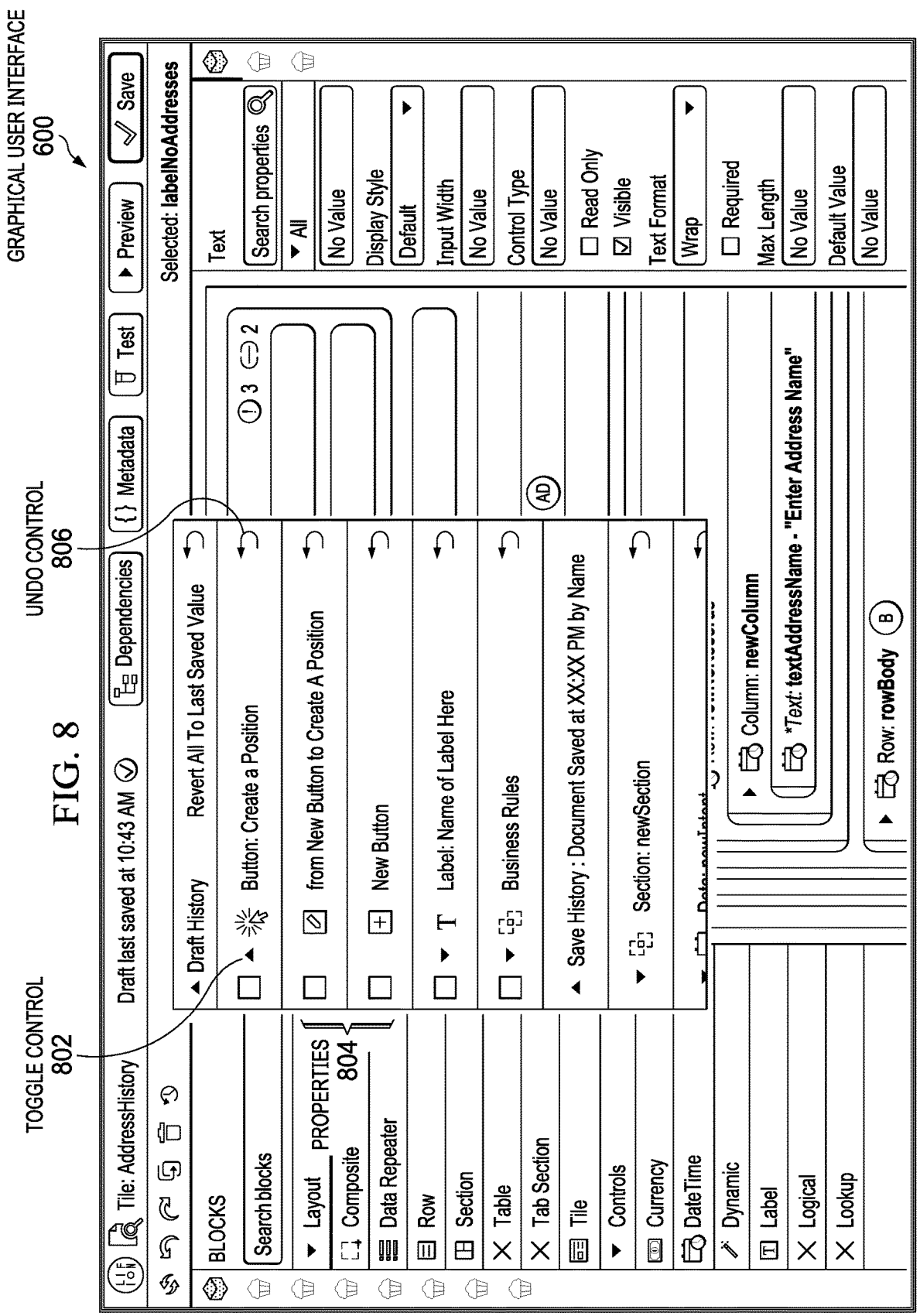
FIG. 8 is an expanded data node within a drop-down menu depicted according to an illustrative example.

With reference next to FIG. 8, an expanded data node within a drop-down menu is depicted according to an illustrative example. Drop-down menu 702 is drop-down menu 702 of FIG. 7.

In an illustrative example, each data node 704 displayed within the drop-down menu 702 includes a toggle control 802. User interaction with the toggle control 802 expands the data node to display the properties 804 of the data node that have been changed from their prior state. As illustrated, each property displayed displays is associated with an undo control 806 that allows the user to individually revert a property of the data node to a prior saved state without affecting changes made to the other properties of the node.

Figure 9:
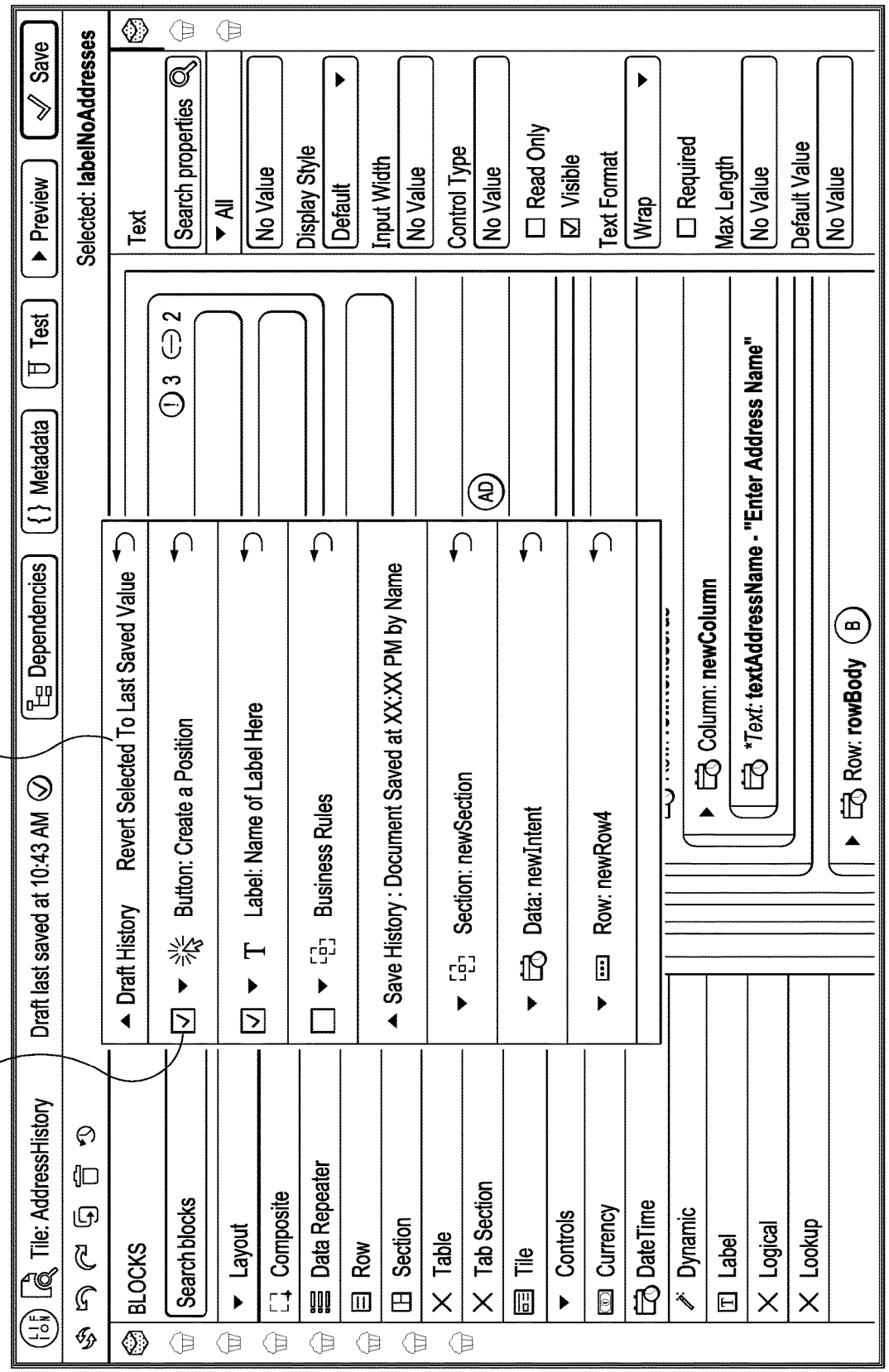
FIG. 9 is a graphical user interface having multiple selected data nodes in a drop-down menu depicted according to an illustrative example.

With reference next to FIG. 9, graphical user interface 700 having multiple selected data nodes in a drop-down menu 702 is illustrated according to an illustrative example.

In this illustrative example, each data node 704 is associated with a selection control 902, allowing the user to select one or more data nodes from the drop-down menu 702. By selecting multiple nodes, graphical user interface 700 enables a user to collectively revert multiple data nodes to their prior state in a single user interaction with undo control 904.

Figure 10:
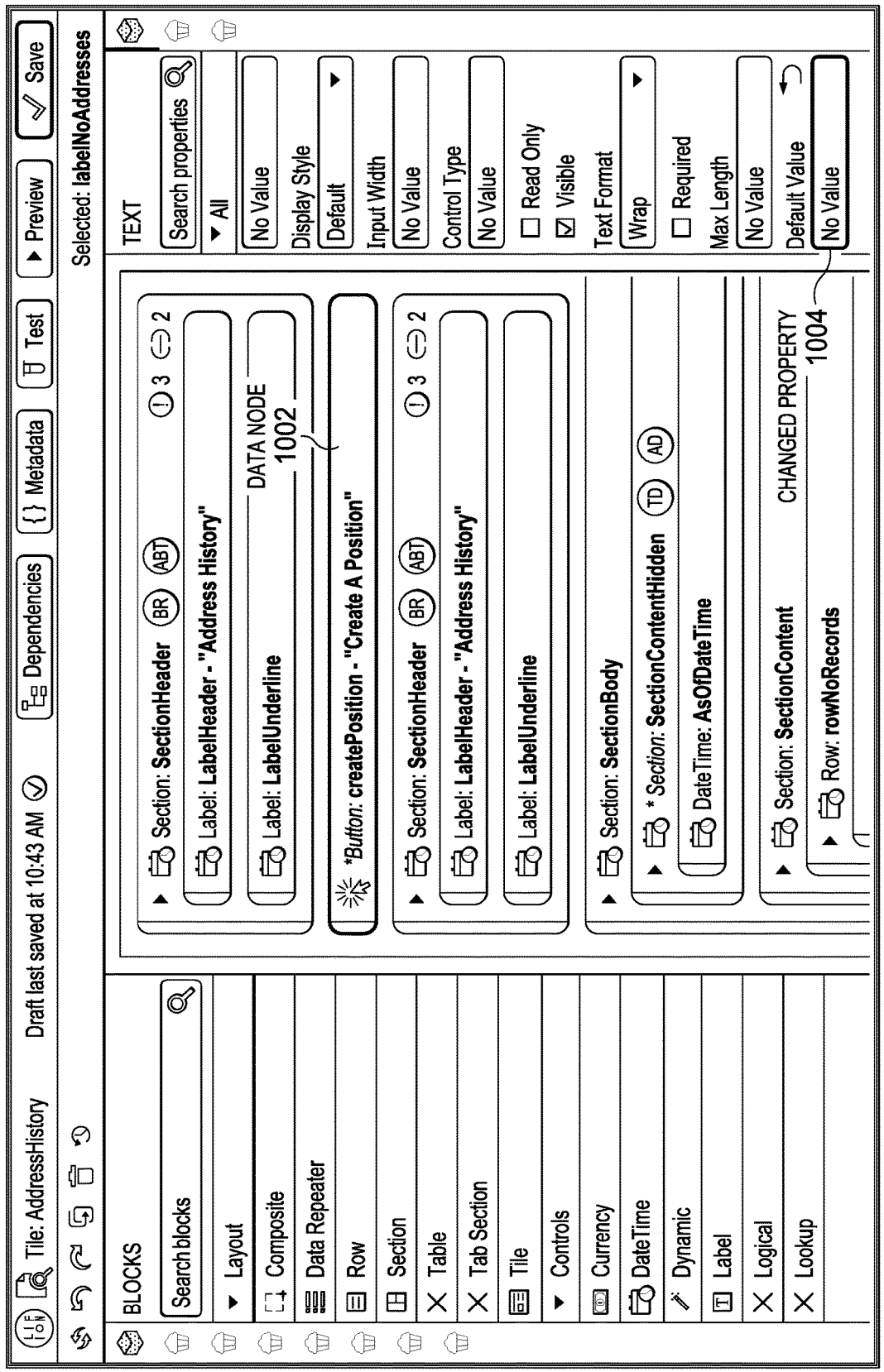
FIG. 10 is a graphical user interface is shown focused on a node of a structured data object according to an illustrative embodiment.

With reference next to FIG. 10, a graphical user interface is shown focused on a node of a structured data object according to an illustrative embodiment. Graphical user interface 700 focuses second area 606 in response to a selection of one of data nodes 704 from the drop-down menu 702.

As illustrated, graphical user interface 600 has focused structured data object 608 on data node 1002. When a user clicks on one of data nodes 704 from the drop-down menu 702, the graphical user interface 600 scrolls second area 606 so that the data node selected from drop-down menu 702 is more prominently displayed in second area 606. Additionally, data node 1002 can be highlighted or otherwise emphasized in second area 606 to draw a user's attention to the selected data node relative to the other nodes of structured data object.

Additionally, graphical user interface 600 scrolls third area 610 so that a changed property 1004 of the selected data node 1002 is more prominently displayed in third area 610. Additionally, the changed property 1004 can be highlighted or otherwise emphasized in third area 610 to draw a user's attention to the changed property of the selected data node.

With reference next to FIG. 11, graphical user interface 600 is illustrated showing a deleted node of a structured data object according to an illustrative example.

In this illustrative embodiment, when a deleted data node is selected from drop-down menu 702, graphical user interface 600 displays the deleted node 1102 in a read-only mode within second area XYZ. Additionally, graphical user interface 600 scrolls second area XYZ and third area 610 to more prominently display the deleted node 1102 and properties 1104 of the deleted node 1102. Additionally, the deleted node 1102 and its properties 1104 can be highlighted or otherwise emphasized relative to the display of other nodes and properties.

Figure 12:
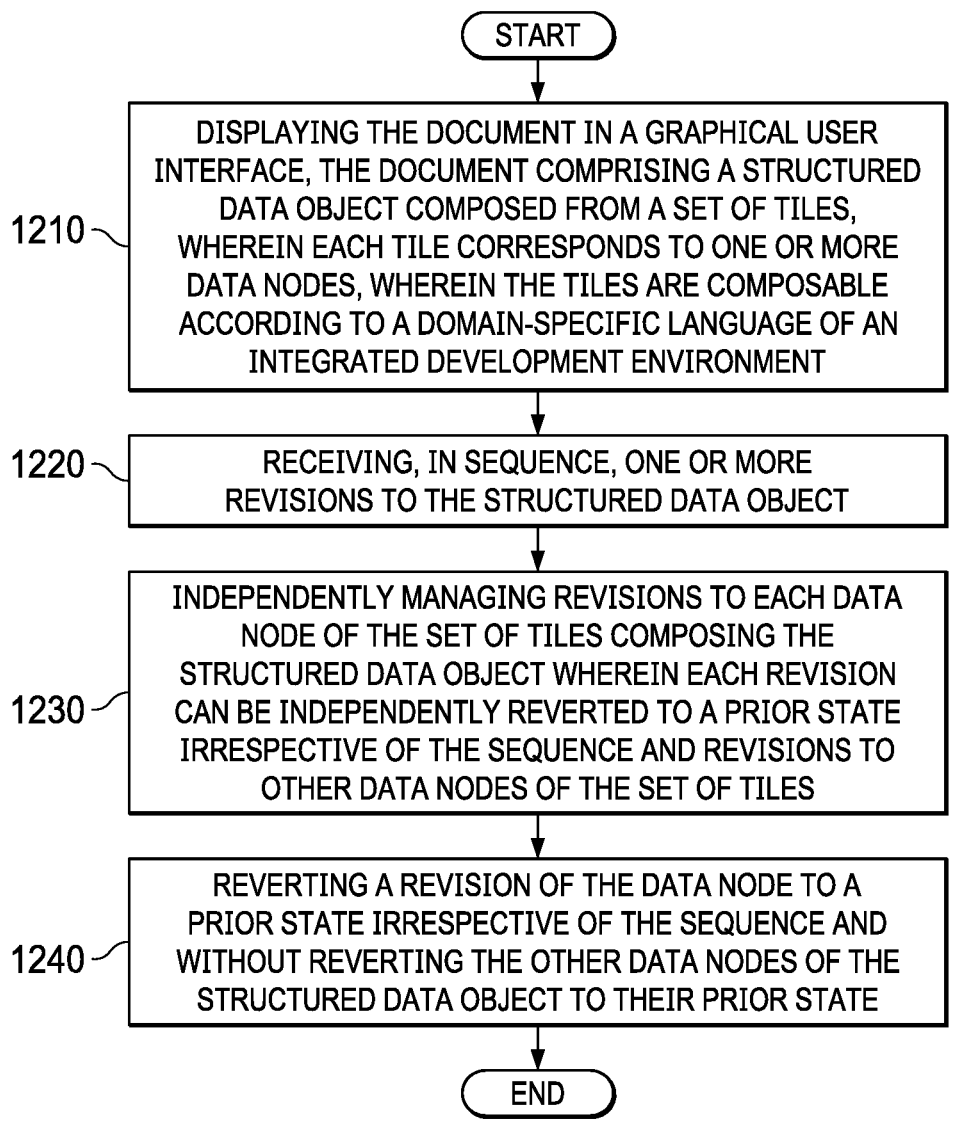
FIG. 12 is a flowchart of a process for managing a document in an integrated development environment in accordance with an illustrative embodiment.

Turning next to FIG. 12, a flowchart of a process for managing revisions in a document in an integrated development environment is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in revision manager 204 in computer system 206 of FIG. 2.

The process begins by displaying the document in a graphical user interface (step 1210). The document comprising a structured data object composed from a set of tiles, wherein each tile corresponds to one or more data nodes. The tiles are composable according to a domain-specific language of an integrated development environment.

The process identifies, in sequence, one or more revisions to the structured data object (step 1220). The process independently manages revisions to each data node of the set of tiles composing the structured data object (step 1230). Because each data node and its revisions are independently managed, each revision can be independently reverted to a prior state irrespective of the sequence and revisions to other data nodes of the set of tiles. In one illustrative example, each revision to the structured data object comprises changing a property of a data node for a tile, changing a value of a data node or a tile, appending an additional tile to the structured data object, or deleting a tile from the structured data object The process reverts a revision of the data node to a prior state irrespective of the sequence and without reverting the other data nodes of the structured data object to their prior state (step 1240). The process terminates thereafter.

Figure 13:
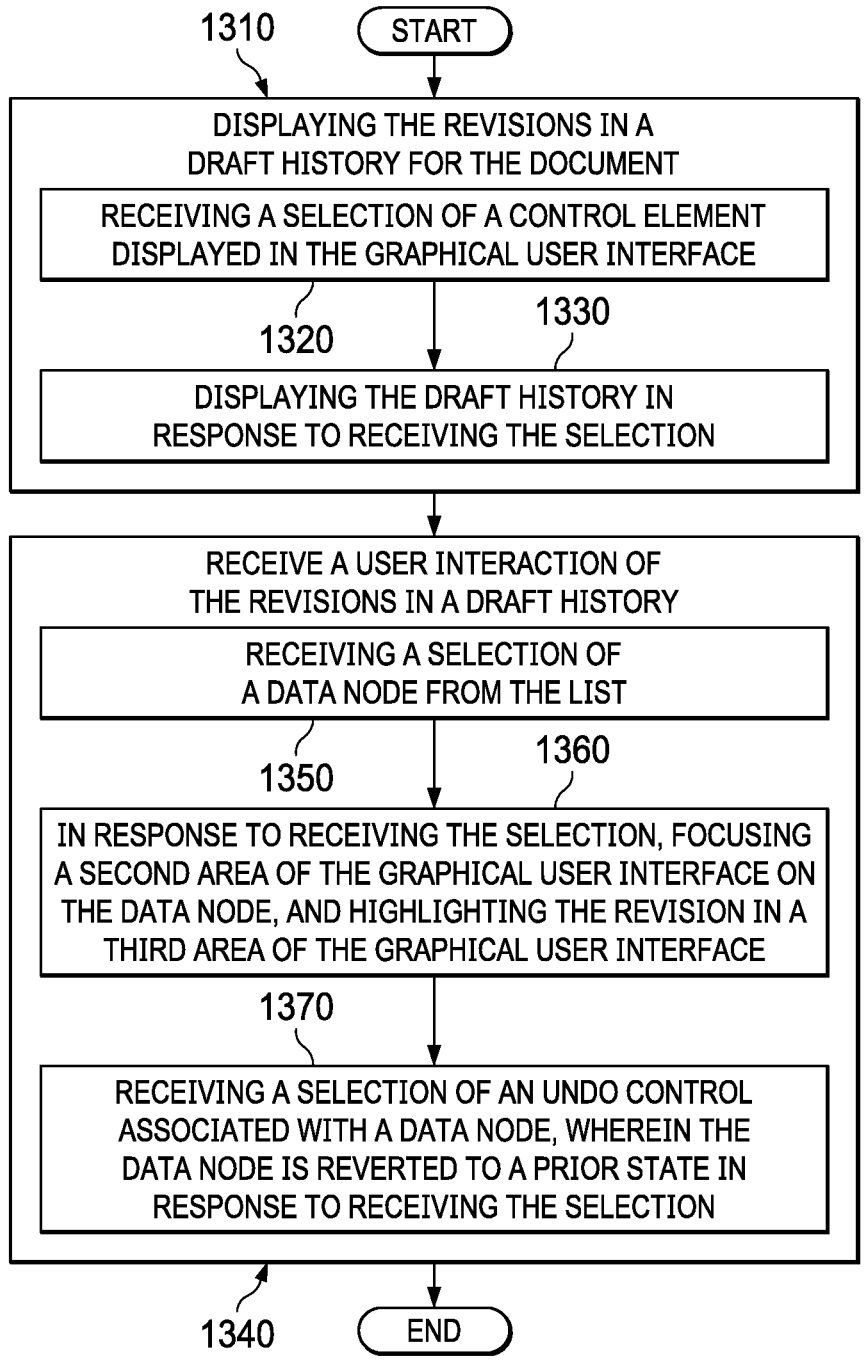
FIG. 13 is a flowchart of a process for managing a document including the display of a draft history in accordance with an illustrative embodiment.

With reference next to FIG. 13, a process for process for managing revisions to a document by displaying a draft history is depicted according to an illustrative example. The process in FIG. 15 can be implemented as part of one illustrative example of the process of FIG. 10.

Continuing from step 1230 of FIG. 12, the process displays the revisions in a draft history for the document (step 1310). The draft history can be draft history 228 shown in block form in FIG. 2. In one illustrative example, step 1310 can include receiving a selection of a control element displayed in the graphical user interface (step 1320). The process displays the draft history in response to receiving the selection (step 1330).

The process receives a user interaction with the draft history (step 1340). The process proceeds to step 1240 of FIG. 12 thereafter.

In one illustrative example, the draft history can include a list of data nodes that has been changed. In this illustrative example, step 1340 can include receiving a selection of a data node from the list (step 1350). In response to receiving the selection, the process focuses a second area of the graphical user interface on the data node, and highlights the revision in a third area of the graphical user interface (step 1360).

In one illustrative example, the draft history can further include separate undo control associated with each data node in the list. In this illustrative example, the process can include receiving a selection of an undo control associated with a data node (step 1370). The process performs Step 1240 of FIG. 12 in response to receiving the selection.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
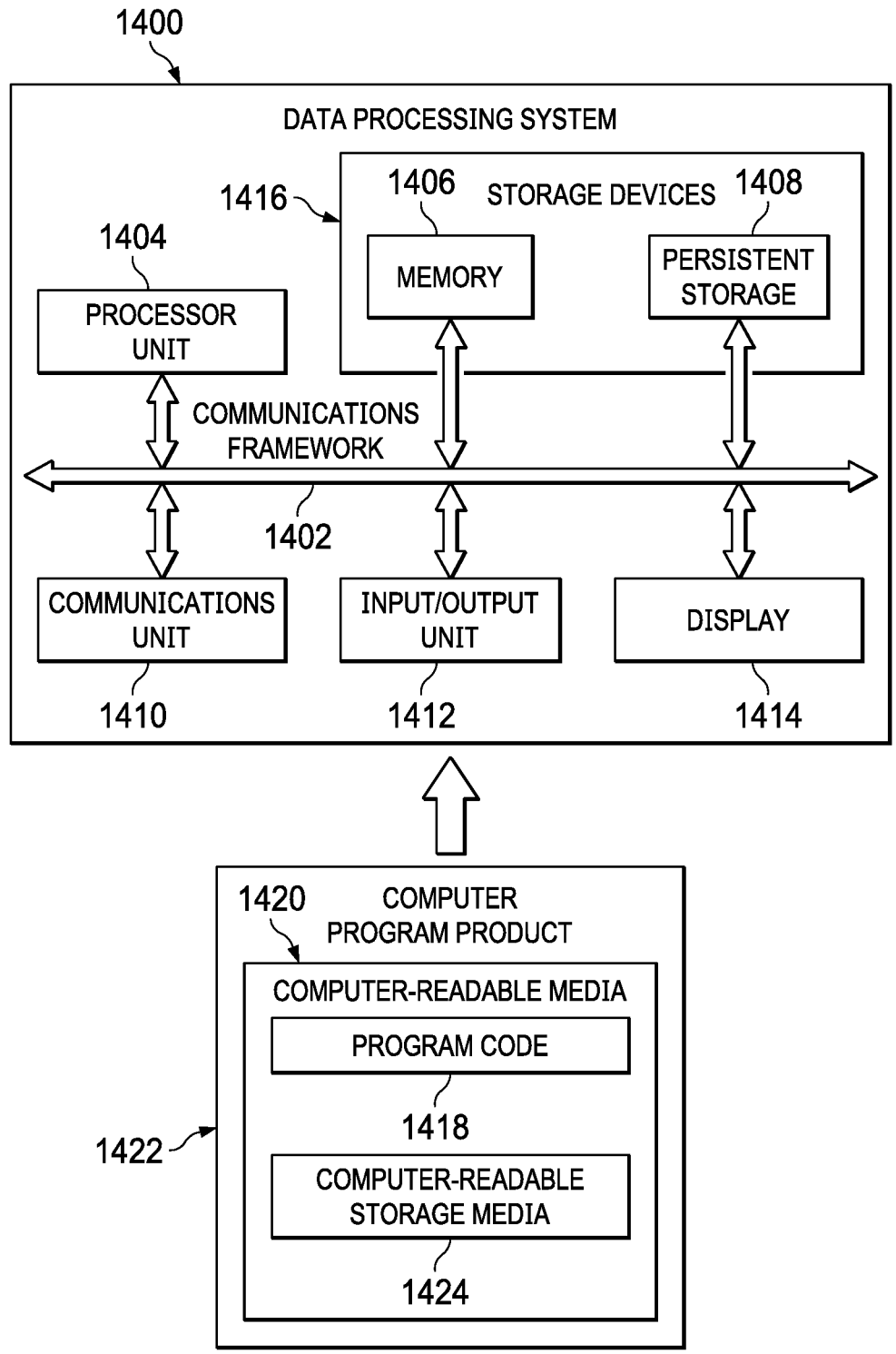
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement server computer 104, server computer 106, client devices 110, in FIG. 1. Data processing system 1400 can also be used to implement computer system 206 of FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for execution by processor unit 1404. Program code 1418 and computer-readable media 1420 form computer program product 1422 in these illustrative examples. In the illustrative example, computer-readable media 1420 is computer-readable storage media 1424.

In these illustrative examples, computer-readable storage media 1424 is a physical or tangible storage device used to store program code 1418 rather than a medium that propagates or transmits program code 1418. The term "non-transitory" or "tangible", as used herein, is a limitation of the medium itself (i.e., tangible, not a signal) as opposed to a limitation on data storage persistency (e.g., RAM vs. ROM). Computer-readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1418 can be transferred to data processing system 1400 using a computer-readable signal media. The computer-readable signal media can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program code 1418 can be located in computer-readable media 1420 in the form of a single storage device or system. In another example, program code 1418 can be located in computer-readable media 1420 that is distributed in multiple data processing systems. In other words, some instructions in program code 1418 can be located in one data processing system while other instructions in program code 1418 can be located in one data processing system. For example, a portion of program code 1418 can be located in computer-readable media 1420 in a server computer while another portion of program code 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing revisions in a document, the method comprising:
    displaying, by a computer system, the document in a graphical user interface in an integrated development environment, the document comprising a structured data object composed from a set of tiles, wherein each tile corresponds to one or more linked data nodes comprising data nodes that act as configuration objects to define execution context to other linked data nodes, wherein the tiles are composable according to a domain-specific language of the integrated development environment;
    identifying, by the computer system, in sequence, one or more revisions to the structured data object;
    independently managing, by the computer system, revisions to each data node of the set of tiles composing the structured data object wherein each revision can be independently reverted to a prior state irrespective of the sequence and revisions to other data nodes of the set of tiles; and
    reverting, by the computer system, a revision of the data node to a prior state irrespective of the sequence and without reverting the other data nodes of the structured data object to their prior state.

2. The method of claim 1, wherein each revision to the structured data object comprises:
    changing a property of a data node for a tile;
    changing a value of a data node or a tile;
    appending an additional tile to the structured data object; or
    deleting a tile from the structured data object.

3. The method of claim 1, further comprising:
    displaying, by the computer system, the revisions in a draft history for the document on a display system.

4. The method of claim 3, further comprising:
    receiving, by the computer system, a selection of a control element displayed in the graphical user interface; and
    displaying, by the computer system, the draft history in response to receiving the selection.

5. The method of claim 3, wherein the draft history comprises:
    a list of data nodes that has been changed; and
    a separate undo control associated with each data node in the list.

6. The method of claim 5, further comprising:
    receiving, by the computer system, a selection of a data node from the list;
    in response to receiving the selection, focusing, by the computer system, a second area of the graphical user interface on the data node, and highlighting the revision in a third area of the graphical user interface.

7. The method of claim 5, further comprising:
    receiving a selection of an undo control associated with a data node, wherein the data node is reverted to a prior state in response to receiving the selection.

8. A document management system comprising:
    a display system;
    a graphical user interface displayed on the display system;
    a computer system; and
    a revision manager in the computer system, wherein the revision manager is configured:
    to display the document in a graphical user interface in an integrated development environment, the document comprising a structured data object composed from a set of tiles, wherein each tile corresponds to one or more linked data nodes comprising data nodes that act as configuration objects to define execution context to other linked data nodes, wherein the tiles are composable according to a domain-specific language of the integrated development environment;
    to receive, in sequence, one or more revisions to the structured data object;
    to independently manage revisions to each data node of the set of tiles composing the structured data object wherein each revision can be independently reverted to a prior state irrespective of the sequence and revisions to other data nodes of the set of tiles; and
    to revert a revision of the data node to a prior state irrespective of the sequence and without reverting the other data nodes of the structured data object to their prior state.

9. The document management system of claim 8, wherein each revision to the structured data object comprises:
    changing a property of a data node for a tile;
    changing a value of a data node or a tile;
    appending an additional tile to the structured data object; or
    deleting a tile from the structured data object.

10. The document management system of claim 8, wherein the revision manager is further configured:
    to display the revisions in a draft history for the document.

11. The document management system of claim 10, wherein the revision manager is further configured:
    to receive a selection of a control element displayed in the graphical user interface; and
    to display the draft history in response to receiving the selection.

12. The document management system of claim 10, wherein the draft history comprises:
    a list of data nodes that has been changed; and
    a separate undo control associated with each data node in the list.

13. The document management system of claim 12, wherein the revision manager is further configured:
    to receive a selection of a data node from the list;
    in response to receiving the selection, to focus a second area of the graphical user interface on the data node, and highlighting the revision in a third area of the graphical user interface.

14. The document management system of claim 12, wherein the revision manager is further configured:
    to receive a selection of an undo control associated with a data node, wherein the data node is reverted to a prior state in response to receiving the selection.

15. A computer program product for managing revisions in a document, the computer program product comprising:
    a computer-readable storage media; and
    program code, stored on the computer-readable storage media, for displaying the document in a graphical user interface in an integrated development environment, the document comprising a structured data object composed from a set of tiles, wherein each tile corresponds to one or more linked data nodes comprising data nodes that act as configuration objects to define execution context to other linked data nodes, wherein the tiles are composable according to a domain-specific language of the integrated development environment;
    program code, stored on the computer-readable storage media, for receiving, in sequence, one or more revisions to the structured data object;
    program code, stored on the computer-readable storage media, for independently managing revisions to each data node of the set of tiles composing the structured data object wherein each revision can be independently reverted to a prior state irrespective of the sequence and revisions to other data nodes of the set of tiles; and
    program code, stored on the computer-readable storage media, for reverting a revision of the data node to a prior state irrespective of the sequence and without reverting the other data nodes of the structured data object to their prior state.

16. The computer program product of claim 15, wherein each revision to the structured data object comprises:
    changing a property of a data node for a tile;
    changing a value of a data node or a tile;
    appending an additional tile to the structured data object; or
    deleting a tile from the structured data object.

17. The computer program product of claim 15, further comprising:
    program code, stored on the computer-readable storage media, for displaying the revisions in a draft history for the document.

18. The computer program product of claim 17, further comprising:
    program code, stored on the computer-readable storage media, for receiving a selection of a control element displayed in the graphical user interface; and
    program code, stored on the computer-readable storage media, for displaying the draft history in response to receiving the selection.

19. The computer program product of claim 17, wherein the draft history comprises:
    a list of data nodes that has been changed; and
    a separate undo control associated with each data node in the list.

20. The computer program product of claim 19, further comprising:
    receiving a selection of a data node from the list;
    in response to receiving the selection, focusing a second area of the graphical user interface on the data node, and highlighting the revision in a third area of the graphical user interface.

21. The computer program product of claim 19, further comprising:
    program code, stored on the computer-readable storage media, for receiving a selection of an undo control associated with a data node, wherein the data node is reverted to a prior state in response to receiving the selection.

* * * * *